United States Patent [19]

Simpson et al.

[11] Patent Number: 4,937,452
[45] Date of Patent: Jun. 26, 1990

[54] CHARGE TRAPPING CORRECTION IN PHOTON DETECTOR SYSTEMS

[75] Inventors: Michael L. Simpson, Knoxville; Thomas W. Raudorf, Oak Ridge, both of Tenn.

[73] Assignee: Ortec Incorporated, Oak Ridge, Tenn.

[21] Appl. No.: 267,425

[22] Filed: Nov. 4, 1988

[51] Int. Cl.$^5$ ............................................. G01N 23/08
[52] U.S. Cl. .......................... 250/370.06; 250/370.01; 378/82
[58] Field of Search ...................... 378/82; 250/370.01, 250/370.06

[56] References Cited

U.S. PATENT DOCUMENTS

| | | | |
|---|---|---|---|
| 3,872,287 | 3/1975 | Koeman | 250/370.06 |
| 4,445,036 | 4/1984 | Selph | 250/370.06 |
| 4,651,005 | 3/1987 | Baba et al. | 250/370.06 |

Primary Examiner—Carolyn E. Fields
Assistant Examiner—David P. Porte
Attorney, Agent, or Firm—Robert P. Cogan

[57] ABSTRACT

In an energy spectroscopy system in which the photon detector such as a germanium detector provides pulses indicative of incident gamma or x-ray radiation, compensation circuitry corrects the amplified pulse output for charge trapping effects in the detector. The compensated output is provided to a prior art multichannel analyzer. The compensation circuit adds to the detected pulse a correction factor proportional to a polynomial function of charge collection time of the carrier being trapped multiplied by the amplitude of the pulse. In this manner, the output pulse is increased to compensate for impediments to charged carrier migration within the structure of the detector, and resolution is improved.

10 Claims, 2 Drawing Sheets

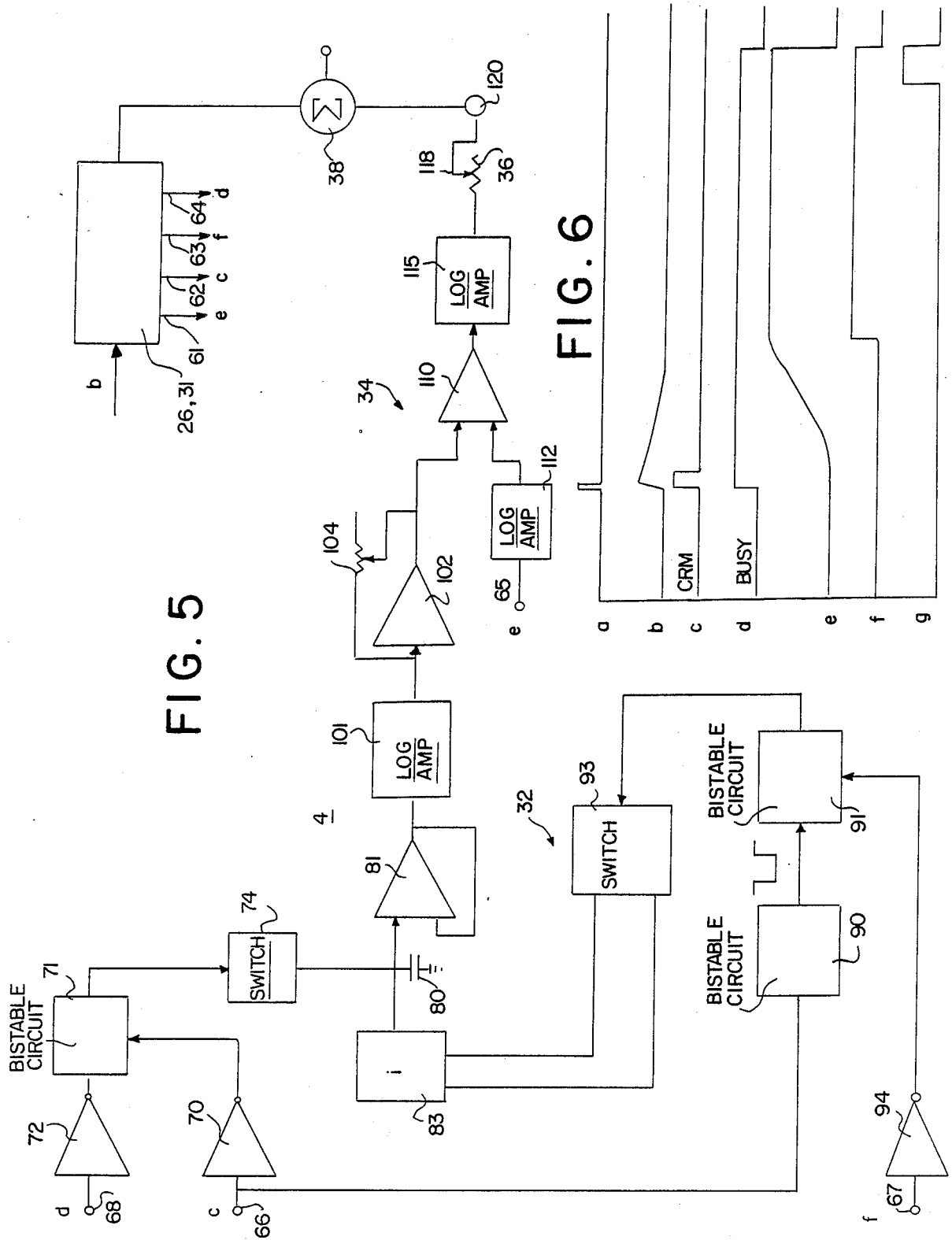

CHARGE TRAPPING CORRECTION IN PHOTON DETECTOR SYSTEMS

BACKGROUND OF THE INVENTION

The present invention relates to energy spectroscopy systems and more particularly to correcting the output of solid state radiation detectors.

A significant context contemplated for the present invention is energy spectroscopy. In an nominal system, a solid state detector is connected to a preamplifier providing output pulses indicative of radiation detected by the detector. The preamplifier output is provided to an amplifier, which may perform prior art pulse shaping functions and provide an output to a well-known multichannel analyzer. The multichannel analyzer performs many functions required for most nuclear spectroscopy measurements. Most typically, a multichannel analyzer is used in the pulse height analysis mode for accumulating a spectrum, or histogram, of the frequency distribution of the heights from a sequence of input pulses. Nuclear and x-ray energy spectroscopy and time spectroscopy comprise the majority of applications for which the pulse height analysis mode is used. The desired spectrum is accumulated by measuring the amplitude of each input event, converting it to a number that is proportional to the pulse height and storing information in a memory comprised of individual channels. The number of counts in each channel is equal to the total number of pulses processed whose amplitudes are in a range corresponding to the channel number. The range width customarily corresponds to the resolution of analog to digital conversion circuitry in the multichannel analyzer. As the gamma ray energy is characterized in terms of the voltage from the spectroscopy amplifier. The spectrum comprises the number of pulses versus the channel number obtained in response to digitizing the pulses. In one form, each value resolvable by analog to digital conversion circuitry may comprise one channel.

One factor affecting resolution of such a spectroscopy system is the inherent capability of a system to provide at the spectroscopy preamplifier terminal a pulse accurately representing the event that caused the detector to provide the output pulse. As recent developments in the art have enabled further refinements in resolution of such spectroscopy systems to provide for correction factors to more accurately represent each event to the multichannel analyzer. The correction factor compensation can be incorporated in the spectroscopy amplifier which couples the preamplifier to the multichannel analyzer. Advances in the art have enabled correction for physical phenomenon occurring in the detector itself.

One prior art effect is known as ballistic deficit. The phenomenon and a correction therefor is explained, for example, in F. S. Goulding and D. A. Landis, *Ballistic Deficit Correction in Semiconductor Detector Spectrometers*, publication LBL 22195, Lawrence Berkeley Laboratory, University of California, Berkeley, Calif. 94720, October 1987. The phenomenon is further described in Billy Loo, F. S. Goulding and Dexi Gao, *Ballistic Deficits in Pulse Shaping Amplifiers*, publication LBL-23356, September 1987, Lawrence Berkeley Laboratory.

A ballistic signal is an output whose amplitude is proportional to the total charge that appeared on the collection electrode of the detector irrespective of the time profile of the charge arrival, such as in a ballistic galvanometer. While the measurement of a signal produced by a semiconductor detector should ideally be a ballistic measurement, this is difficult to achieve in the case of a spectrometer where pulse shaping circuits used in spectrometers are designed to produce output pulses whose total duration is usually limited to a few microseconds. The peak of the output pulse, which occurs at a time less than half the pulse width is used as a measure of the input charge signal from the detector. For large, coaxial germanium gamma ray detectors and thick silicon charged particle detectors, charge collection times fluctuate between events depending on the location of interactions. More qualitatively stated, the same event, i.e. absorption of a gamma ray in the detector may produce a different pulse amplitude depending upon the point of interaction in the detector.

"Ballistic deficit effects" result in fluctuations in the detector charge signal rise times, which result in fluctuations in the amplitudes of the spectroscopy amplifier pulses. While system resolution may be limited by electronic noise at low energies, more subtle effects such as ballistic deficit may become dominant at higher energies.

These same investigators also recognize that in semiconductor detectors, fluctuations in the peaking time of the input signals are often results of distribution of charge origins within a detector volume, field inhomogeneities or charge trapping. From the point of gamma ray interaction, majority and minority carriers must migrate to their respective electrodes. The carrier which travels the longer distance controls the preamplifier, or charge signal, rise time. The further this charge must migrate from where the gamma ray is absorbed, to the electrode, the greater will be the charge signal rise time sensed at the preamplifier output. This fluctuation in charge signal rise times affects proportionately the peak amplitude of the spectroscopy amplifier output. This effect on the spectroscopy amplifier output is characterized as the ballistic deficit. One circuit is proposed to compensate for relative ballistic deficit by correcting the pulse amplitude provided to the multichannel analyzer. The degree of correction necessary is characterized by the peak signal amplitude deficit. The peak signal amplitude deficit is related to the peak amplitude for a zero rise time signal times the square of the pulse peak delay time divided by peaking time for output with zero rise time input signal. Pulse peak delay time is a function of the geometry of the detector related to the distance a charge must migrate to reach an electrode. This relationship is utilized to provide circuitry to provide for ballistic deficit correction. While charge trapping fluctuations are recognized, they are of a type which slow the charge but do not prevent its being recognized as a component represented in the preamplifier output. Additional corrections are not made therefor.

In the detector, radiation results in creation of a charge. Majority and minority charge carriers need to migrate from the point in the detector where they are generated to electrodes in order to be sensed. Charge traps are physical and electrical impediments which impede the migration of charge carriers from the initial location of the charge to the electrode. In use of the above-described circuit, it is assumed that charge trapping phenomenon is due to shallow traps whose time for capture and re-emission of charge carriers were shorter than the pulse processing time. Therefore, effects due to deep level traps which prevent charge from reaching the detector output during pulse processing are not accounted for. Consequently a further deficit phenomenon will affect the spectroscopy amplifier output. In accordance with the present invention, it is recognized that deep level trapping is encountered significantly more often in physical situations than shallow level trapping. Improvement is provided in resolution compared to correcting only for the sort of ballistic deficit effects described above is provided based on a deep trap model which does not assume that capture / emission times are substantially shorter than pulse processing time.

SUMMARY OF THE INVENTION

It is therefore an object of the present invention to provide in an energy spectroscopy system means and method for improving resolution by correcting pulse outputs indicative of incident radiation in a solid state detector in accordance with a selected function chosen to compensate for charge trapping.

It is a more specific object of the present invention to provide for an improvement of the type described specifically accounting for charge correction based on a deep trap model.

It is another object of the present invention in one form to provide a ballistic deficit correction circuit further modified for provision of a charge trapping correction function.

It is also an object of the present invention to provide a solid state detector circuit and method for providing an output indicative of an event giving rise to a charge in the detector, and improving resolution of the event peak compared to correction solely for ballistic deficit.

Briefly stated, there is provided in accordance with the present invention an improvement in the context of energy spectroscopy in which a solid state detector provides an output pulse to means for resolving and responding to the energy of the incident radiation on the detector. A pulse output indicative of the incident radiation in the solid state detector is applied to well-known amplifier and compensation circuit. An "on the fly" correction is made to augment the amplitude of the sensed pulse amplitude and consequently its apparent rise time to virtually eliminate distortion due to charge trapping. The peak is detected and stretched and applied to an analog computer, where the peak value indicated thereby is multiplied by a polynomial function of charge collection time multiplied by the pulse amplitude. The value of a power in the polynomial function is selected in accordance with the present invention to provide a proper correction level for closely approximating the magnitude of the actual event.

BRIEF DESCRIPTION OF THE DRAWINGS

The means by which the foregoing objects and features of invention are achieved are pointed out with particularity in the claims forming the concluding portion of the Specification. The invention, both as to its organization and manner of operation may be further understood by reference to the following description taken in connection with the following drawings.

Of the drawings:

FIG. 5 is a schematic diagram of one implementation of the charge trapping in correction circuit of FIG. 1; and FIG. 6 is a waveform chart useful in understanding the operation of the present invention.

DESCRIPTION OF THE PREFERRED EMBODIMENTS

Figure 1:
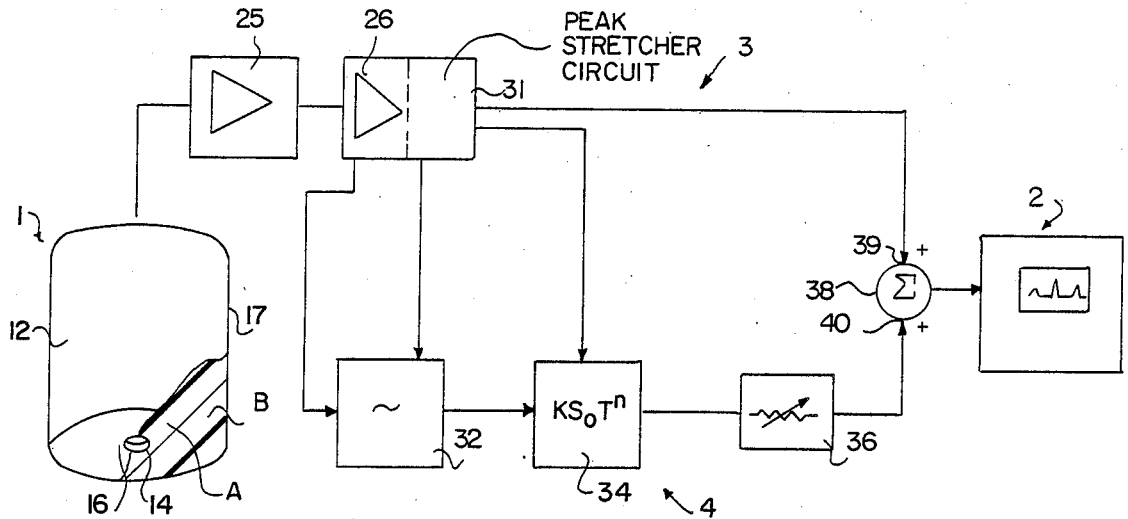
FIG. 1 is a block diagrammatic representation of an energy spectroscopy system embodying the present invention, with a germanium detector therein illustrated both in axonometric form partially broken away and in schematic form.

Referring now to FIG. 1 there is illustrated, partially in the form of a mechanical illustration and in block diagrammatic form, an energy spectroscopy system in which outputs from a germanium detector 1 are analyzed and in which information for utilization by a user is provided from a multichannel analyzer 2. Conventional signal shaping circuitry 3 is provided along with charge trapping correction circuitry 4 to further refine inputs to the multichannel analyzer 2 as described below.

Prior to a description of the entire circuit, the detector 1, its nominal operation, and inherent effects therein discussed in the introductory portion of the present specification are further described. The detector 1 is a solid state detector commonly supplied with a cryogenic field effect transistor for providing output pulses in response to absorption of gamma rays. The photon detector system commonly consists of the semi-conductor germanium detector element, a cryostat, a liquid-nitrogen dewar, a charge-sensitive preamplifier and a cable pack. These are conventional components and are illustrated herein simply as the detector 1. The solid state detector 1 may be P or N type. Commonly, the detector 1 comprises a germanium crystal 12 substantially cylindrical having a central axial bore 14 extending through, in most cases, less than the entire axial length of the germanium crystal 12. A thick contact 16 is formed on the central bore having a thickness on the order of 600$\mu$, and a thin contact 17 is formed on an outer surface of the crystal having a thickness on the order of 0.3$\mu$. A commercial example of such detector made by Ortec, Incorporated is known by the trademark GAMMA-X. In a P-type detector, the positions of the thick and thin contacts are reversed.

The detector 1 is partially broken away to illustrate in cross-sectional forms positions in which different gamma rays positions A and B in which different gamma rays may be absorbed. Position A is radially farther from the thick contact 16 than position B. Different effects described below will affect the manner in which each gamma ray is perceived by the system. As recent developments in the art have enabled further refinements in resolution of such spectroscopy systems to provide for correction factors to more accurately represent each event to the multichannel analyzer. Within the level of resolution of the system, these perceptions will be different even though each gamma ray has the same energy.

Figure 2:
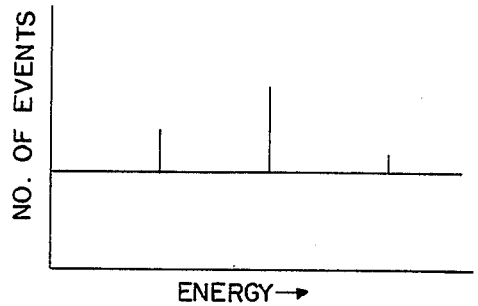
FIGS. 2 and 3 are charts of number of events versus energy level for a nominal example, with FIG. 2 representing an idealized representation and FIG. 3 representing a nominal actual system.
Figure 3:
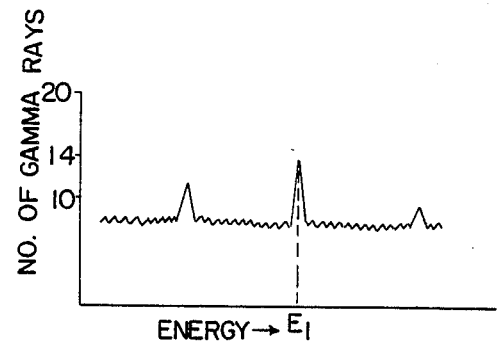

FIGS. 2 and 3 are each a chart of number of events, e.g. gamma rays absorbed, versus energy per event, each chart having arbitrary but identical units. It is the histogram of number of events characterizing a particular gamma ray event versus particular energy that is the information sought to be provided from the multichannel analyzer 2. FIG. 2 represents an idealized spectrum in which width of peaks in a true spectrum are limited only by Heisenberg's Uncertainty Principle. These peaks would be extremely narrow. FIG. 2 may represent a nominal situation with respect to the actual energy of the gamma rays absorbed in the detector 1. On the other hand, FIG. 3 represents a nominal electronic perception of gamma rays having the actual energy distribution illustrated in FIG. 2. In the spectrum perceivable by state-of-the-art systems, the primary difference is broadening of peak widths, which results in a decrease in resolution of the system. Different, well-known causes result in this broadening such as electrical noise in preamplifier and amplifier circuits and statistical fluctuations in the detector. Ballistic deficit is also described in the prior art references cited above, and charge trapping is also referred to. In accordance with the present invention, charge trapping is recognized to be associated with a mechanism for which compensation is desirable to be provided.

Figure 4:
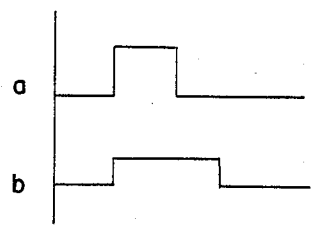
FIGS. 4a and 4b are each a plot of amplitude versus time describing outputs of the detector in FIG. 1 and arbitrary but identical units.

First, the ballistic deficit effect is illustrated with respect to FIGS. 4a and b drawn on a common time abscissa, with arbitrary and identical units of amplitude on the ordinate. This effect is described with respect to FIG. 1. When each of the gamma rays absorbed at position points A and B in the detector 1 respectively, the detector generates majority and minority carriers The majority carriers, such as electrons, migrate toward the contact 16 in the N type detector while the minority carriers, or holes, migrate toward the thin contact 17. The point B is radially farther away than the point A from the detector contact 16. The carrier which controls the charge collection time, i.e. electrons, in this example, have a longer distance to travel to the inner electrode 16. A longer current pulse output from the detector 1 is produced in response to the gamma ray absorbed at point B than the gamma ray absorbed at point A. Because of the pulse shaping network and the circuitry described below, the longer duration of the current pulse originating at point B causes the amplitude of the voltage pulse out of the spectroscopy amplifier to be smaller for the pulse originating at point B than that originating at point A. Even though the gamma rays have the same energy, the multichannel analyzer 2 will place the gamma ray absorbed at point B at a slightly lower level in the energy spectrum than that at point A. This difference is the ballistic difference described above with respect to the prior art references.

There is also a charge trapping deficit which effectively reduces the apparent amplitude and increases its apparent length. This effect illustrated in FIGS. 4a and 4b which are illustrations of differing perceptions of the same event. Trapping of charge in a semiconductor occurs when a carrier is captured by an impurity or imperfection center and is temporarily or permanently lost to the charge transport process. The prior art accounts for charge trapping in a model in which trap are trapped and then re-emitted by shallow traps within the pulse processing time. In such a case these traps would lower the amplitude and lengthen the duration of a pulse indicating an event. Consequently, an event described by the pulse illustrated in FIG. 4a would be perceived as the pulse illustrated in FIG. 4b. However, if shallow traps are the dominant charge trapping mechanism, a gated integrator should improve the resolution of detectors which exhibit a significant amount of charge trapping. Experiments have shown that the use of a gated integrator did not improve the resolution of trapping detectors at long pulse shaping times. However, in accordance with the present invention, dramatic improvements in resolution were made based on a deep trap model which does not require the assumption of charge carrier re-emission. As further described below, charge trapping correction for the deep trap model is provided in addition to the prior art correction for ballistic deficit which has some inherent correction for shallow traps.

FIG. 1 is now again referred to in greater detail. In FIG. 1, waveforms are marked at particular terminals, corresponding to the wave form appearing at that terminal, further described with respect to FIGS. 5 and 6. The output of the radiation detector 1 may be described as an impulse and is connected to a conventional charge sensitive preamplifier 25, which in turn provides an output to a prior art spectroscopy amplifier 26. The amplifier 26 provides an output comprising a voltage pulse, whose peak amplitude should correspond to the energy of the event sensed by the detector 1. To this end, the compensation circuitry 4 is utilized. The spectroscopy amplifier 26 includes a linear gate and peak stretcher circuit 31. A peak level $S_o$ is provided. This is a common function provided in commercially available amplifiers, further discussed with respect to FIG. 5. The spectroscopy amplifier 26 provides an output to a charge collection time circuit 32 used to measure $\tau$, the charge collection time. The circuit 32 receives a second input from the linear gate and peak stretcher circuit 31. Both the circuits 31 and 32 provide outputs to an analog computer 34 which provides a polynomial function of both $S_o$ and $\tau$. The output of the analog computer 34 is coupled via a variable attenuator 36 to a summing circuit 38 having a first input 39 connected from the linear gate and peak stretcher circuit 31 and a second input 40 connected from the variable attenuator 36. The output of the summing circuit 38 is supplied to the multichannel analyzer 2. Essentially, the height of the pulse representing the energy of the event in the detector 1 is provided from the linear gate and peak stretcher circuit 31 to the summer circuit 38. At the input 40, an addition is made thereto to compensate for charge trapping so that the gamma ray energy perceived by the multichannel analyzer 2 will be corrected for charge trapping. Consequently, the event will be sorted by the multichannel analyzer 2 to the right energy in the histogram so that the sort of representation illustrated in FIG. 3 provided for the particular spectral analysis will be more accurate.

OPERATION

In operation, an event occurs in the detector 1 to produce an impulse at the output thereof which is sensed by the preamplifier 25. The input from the preamplifier 25 triggers a signal in the spectroscopy amplifier 26 which indicates that an event has occurred and which is coupled to the circuit 32 to initiate a pulse procesing time span. This signal is provided to the charge collection time circuit 32 to initiate a measurement of a value called unipolar peak time, Tu, which is a measurement of the time needed for a pulse to reach its peak. When the peak, referred to as the amplitude $S_o$, is reached, the linear gate and peak stretcher circuit 31 sends a peak detection signal to the charge collection time circuit 32 to complete the measurement of Tu, the value of which is proportional to the time needed for $S_o$ to reach its peak. The time collection circuit 32 includes means for subtracting a linear offset from Tu in order to calculate a time known as the unipolar peak delay time, Td. The unipolar peak delay time is the time that the unipolar peak is delayed due to a value known as charge collection, $\tau$. The linear offset is the unipolar peaking time for the case of instantaneous charge collection. This offset can be calculated in a calibration operation in which a known rise time from a fast pulse generator is connected to the input of the spectroscopy amplifier 26 and the unipolar peaking time is measured. Other methods are known in the art.

Td is indicative of $\tau$, the majority charge collection time of the detector 1. Since there is a one to one correspondence of Td to $\tau$, the circuit 32 is said to measure the majority charge collection time, often on the order of 100 ns. More rigorously, the proportion of Td to $\tau$ is substantially constant for the radial outer 80%. The proportion of Td to $\tau$ increases for the radial inner 20%. In this embodiment, it is not necessary to account for this effect to improve resolution.

The value $S_o$ is coupled from the peak detector and stretcher circuit 31 and coupled to the multichannel analyzer 2. This is a conventional operation in which a peak input is gated into the multichannel analyzer for conventional analysis. However, in the following manner, within the same signal processing cycle, a further analog function is generated for addition at the summing input 40 to correct the peak $S_o$ for charge trapping.

The analog computer 34 is a conventional multiplying circuit, which in accordance with the present invention is selected to provide a polynomial function. The particular polynomial function is $KS_o\tau^n$. It is noted the Td value genereged herein is used as the value of $\tau$. In most practical cases, $1 < n < 3$. The above-cited Goulding and Landis deficit correction computed an $n = 2$ correction. In accordance with the present invention, n is not automatically set equal to 2, but is selected. K is also selected. In this manner, correction can be provided for deep charge traps and can also be maximized for different operating conditions further discussed below. K can then be varied for best results. "Best results" means best improvement in resolution. Each multichannel analyzer utilized commercially has its own resolution determination procedure. A common resolution test is measurement of the full width at half maximum of the 1.33 MeV line of a cobalt 60 source.

The output of the analog computer 34 is coupled to the summing input 40 to provide the amplitude correction to the value $S_o$ for gating to the multichannel analyzer 2, which provides conventional analysis of the corrected input thereto.

What is thus provided is a method and apparatus for correcting the amplitudes of pulses provided in energy spectroscopy to compensate for charge trapping defects.

FIG. 5 is a partial representation of FIG. 1 illustrating the compensation circuit 4 in schematic form. In FIG. 5, the same reference numerals are used to denote components corresponding to those in FIG. 1. In the embodiment of FIG. 5, a particular form of commercially available spectroscopy amplifier 26 and linear gates and peak stretcher 31 is provided having the outputs further described with respect to FIG. 6 below. An example is an Ortec Model 672 spectroscopy amplifier connected to an ORTEC Model 542 linear gate and peak stretcher. In other embodiments, those skilled in the art will be enabled to select appropriate connections from other forms of spectroscopy amplifier in accordance with the teachings below. FIG. 6 is a waveform chart. The waveforms illustrated in FIGS. 6a through 6g are each plotted on an ordinate of arbitrary amplitude units versus a time abscissa. Adjacent to terminals in FIG. 5 are marked letters corresponding to the portion of FIG. 6 illustrating the waveforms appearing at those terminals. Additionally a few further waveform notations are made on FIG. 5.

FIG. 6a represents the impulse received from the detector 1 indicative of an event. FIG. 6b represents an output from the preamplifier 2. FIG. 6c identifies a waveform which may be referred to as CRM. This is a square wave of preselected duration that can be used to inform circuitry that an event has occurred and the processing cycle is to begin. FIG. 6d represents a signal which may be entitled BUSY. This time period represents an above-described pulse processing cycle that begins with detection of an event and ends with completion of provision of an output pulse from the linear gate and peak stretcher circuit 31. In FIG. 6e, there is illustrated what is referred to as a stretched unipolar signal, which is formed by the linear gate and peak stretching circuit 31 of FIG. 1. The amplitude reached by the waveform in FIG. 6e is the amplitude $S_o$ described with respect to FIG. 1. In FIG. 6f, a waveform entitled "peak detect" is provided which is substantially a square wave initiated when the unipolar signal reaches its peak and is held at its positive value until the completion of a pulse processing cycle. A portion of the stretched unipolar signal starting a fixed time after the peak detect signal has gone to the logic high level and having a predetermined duration is gated out to form the output of the linear gate and peak stretcher circuit 31 shown in FIG. 6g. The pulse processing cycle is completed on reset of this signal.

Referring in greater detail to FIG. 5, the waveforms described with respect to FIG. 6 are respectively provided at output terminals 61, 62, 63 and 64 of the spectroscopy amplifier 26 and linear gate and peak stretcher 31. The terminals 61 through 64 are respectively connected to terminals 65, 66, 67 and 68 of the correction circuit 4. One objective of the circuit of FIG. 5 is to generate Td which is used as the value of $\tau$. At the terminal 66, the waveform of FIG. 6c indicative of occurrence of an event and initiation of a data processing cycle is provided. This pulse is coupled through an inverter 70 to a bistable circuit 71. The terminal 68, at which the BUSY signal illustrated in FIG. 6d and defining a data processing cycle is provided, is coupled by an inverter 72 to the bistable circuit 71. The bistable circuit 71 controls the state of a switch 74 connected to an integrating capacitor 80. The integrating capacitor 80 provides a voltage level indicative of the instantaneous value Td supplied to an input of a buffer amplifier 81. A switched current source 83 is provided to begin charging of the integrating capacitor 80 until, as further described below, charging is stopped and the voltage across the capacitor 80 is held for the remainder of the processing cycle. When the CRM pulse of FIG. 6c occurs, the switch 74 is opened. During the pulse procesing cycle, the switch 74 is held open to permit charging of the integrating capacitor 80. At the end of the cycle, when the busy signal goes to its low state, the switch 74 is turned on and resets the integrating capacitor 80.

Conveniently, the inverters 72 and 70, as well as an inverter further described below may be conveniently comprised of a 74LS04. The bistable circuit 71 is, for example, a 74F74 and the buffer circuit 74 is a SD5000 MOSFET array. The terminal 66 also connects the CRM pulse indicative of the beginning of a processing cycle to a bistable circuit 90 which provides a square wave output of predetermined length to a second bistable circuit 91. This predetermined length is set to be equal to the unipolar peaking time for instantaneous charge collection further discussed above. The output of the circuit 91 is connected to a switching circuit 93 having first and second outputs connected to switch the switched current source 83. A second input to the bistable circuit 91 receives an output from an inverter 94 having the terminal 67 as its input. The input terminal 68 is representative of the beginning of the pulse processing cycle. This signal triggers the bistable circuit 90 to provide the above-described wave output, at the end of which the output of the bistable circuit 91 is set to a high state. The switched current source 83 is consequently switched to charge the integrating capacitor 80. When a peak is reached, the input coupled from the terminal 67 triggers a change of state of the output of the bistable circuit 91 so that the integrating capacitor 80 ceases to be charged further, and the potential thereacross is held. Consequently, the output of the buffer amplifier 8 is indicative of $\tau$. The bistable circuit 90 may comprise a 74LS222. The logic circuit 91 may comprise a 74F74 and the switching circuit may comprise a 74F74 and the switching circuit may comprise a 10124S. The buffer 81 may conveniently comprise an OP42 as may the amplifiers described below. A log amplifier and an anti-log amplifier described below may be conveniently comprised of an AD759N.

The output of the buffer amplifier 81 is connected to a log amplifier 101. The output thereof, indicative of log $\tau$ is provided to an operational amplifier 102 connected with a potentiometer 104 connected in its feedback loop such that the output thereof is proportional to the input thereto. Consequently, the potentiometer 104 can be used to set a multiplier of the log of the value of Td. Consequently, the potentiometer 104 is used to set an exponent which will be applied to the value of Td. The output applied from the amplifier 102 is thus indicative of $\tau^n$ this input is provided to a first input of a summing amplifier 110. Similarly, the input e which reaches the peak value $S_o$ is applied to a log amplifier 112 whereby the output thereof is representative of log $S_o$ and connected to a second input of a summing amplifier 110. The output of the summing amplifier 110 is equal to n log Td plus log $S_o$. This output is provided to a log amplifier 115 connected in the anti-log mode whereby the output thereof is indicative of $\tau^n S_o$. The output of the log amplifier 115 is connected through a potentiometer 118 providing an output at a terminal 120 for connection to the summing circuit 38. The potentiometer 118 can be used to set the value K described above.

In accordance with the present invention, both the values of K and n are selectable. The value of n establishes functional dependence. For example where n is set to 2, then a value of $\tau_1$ will be given four times the weight of $\tau_2$ where $\tau_1 = 2\tau_2$. The value of K will provide the same multiplier applied to all values of $\tau$. It has been found in accordance with the present invention that a range of $1 < n < 3$ will be very useful in many foreseeable situations. It has been found that in an example of an N type detector having a high voltage bias applied thereto and a higher density of traps radially adjacent the outer edge, a value of n=3 was preferred.

In a system using a neutron damaged P type detector in which the field varied as 1/r, with r being the radial distance from a central axis, best resolution was provided at n=2.38. Where minority carriers were trapped in another example, n was set equal to 1.5. Those skilled in the art will develop experience to correlate desired values of n with particular operating factors. For example, if a user employs a germanium detector having a factory specified resolution of 2.0 KeV, and in practice the resolution decreases to 2.4 KeV, neutron damage, particularly in view of the circumstances of use of the detector will be indicated. This will provide a reason for trying to adjust n. Similarly K may be selected for best performance. It is often convenient to set K initially at a low level and generate a relationship of resolution versus K.

Even where no experience baseline exists for selection of both n and K, only a limited amount of manipulation is required in the adjustment process since improved resolution is a quantitative measure readily ascertained with a minimum of manipulation. Indeed it is contemplated that a closed loop circuit could be provided to adjust n and K automatically to in effect null an error from an optimized level of resolution. However, the relative simplicity in adjusting n and K for best resolution manually does not make this a necessity.

Even where no experience baseline exists for selection of both n and K, only a limited amount of manipulation is required in the adjustment process since improved resolution is a quantitative measure readily ascertained with a minimum of manipulation. Indeed it is contemplated that a closed loop circuit could be provided to adjust n and K automatically to in effect null an error from an optimized level of resolution. However, the relative simplicity in adjusting n and K for best resolution manually does not make this a necessity.

The specification has been written with a view toward enabling those skilled in the art to make decisions as to why an output signal from a spectroscopy amplifier should be modified in order to accommodate for charge trapping due to charge traps characterized by a deep trap model. Additionally, the specification has been written with a view toward enabling those to produce many forms of circuit not specifically described herein in accordance with the above teachings. For example, the schematic circuit of FIG. 6 will provide compensation for majority carrier charge trapping. However, a similar circuit could be embodied for compensation for minority charged characters. In this case, $\tau$ would be replaced with a value indicative to the charge collection time for minority carriers which would comprise $Td_{max} - Td$ where $Td_{max}$ is the maximum unipolar peak delay time for a detector 1 and Td is a particular unipolar peak delay for an event in detector 1. In this manner, many forms of charge trapping correction circuit can be provided in accordance with the present invention.

What is claimed is new and desired to be secured by Letters Patent of the United States is:

1. In an energy spectroscopy system comprising solid state detector means for producing an electrical impulse in response to an event and means supplying inputs to a multichannel analyzer, said means including peak detection circuitry for defining a peak amplitude indicative of the event, the improvement of: means for compensating the peak level for charge trapping comprising; means for producing an output indicative of a value $\tau$ indicative of charge collection time, means for measuring said peak level, means for producing a polynomial function for charge trapping correction in response to inputs indicative of said collection time and said peak level, and means for adding to said peak level an input indicative of said polynomial function within a pulse processing cycle for said peak, whereby a corrected peak output is provided to said multichannel analyzer.

2. The apparatus according to claim 1 wherein said means for providing a polynomial function comprises analog computer means for providing an output indicative of the function $KS_o\tau^n$, where K is a constant, $S_o$ is indicative of the peak sensed from the output of said detector and $\tau$ equals a measured charge collection time.

3. The apparatus according to claim 2 wherein said analog computer means is selected to provide a value of n from between 1 to 3.

4. A method for correcting measured amplitudes indicative of the energy of events in an energy spectroscopy system comprising: measuring the charge collection time for a particular event, measuring the amplitude of the event, and adding to the measured amplitude a value indicative of a polynomial function of the charge collection time and peak amplitude for correction of amplitude deficit due to charge trapping.

5. The method according to claim 4 where in the step of adding a value indicative of a polynomial function comprises adding a function indicative of $KS_o\tau^n$ wherein K is a constant, $S_o$ is indicative of the peak sensed from the output of said detector and $\tau$ equals a measured charge collection time.

6. The method of claim 5 where the step of adding comprises adding a function wherein n=from 1 to 3.

7. The method of claim 6 comprising varying each of n and K and measuring change in resolution in response thereto.

8. Charge trapping correction means for inclusion in an energy spectroscopy system comprising a spectroscopy amplifier, means for gating an output indicative of a peak level of a pulse indicative of the energy of an event in a solid state detector to utilization means, means for providing a level indicative of said peak, means for providing output indicative of a charge collection time equal to a unipolar peaking time for an event minus a unipolar peaking time for instantaneous charge collection, means for generating a polynomial function of said peak and said charge collection time and for adding a value proportional to said function to the gated output of said spectroscopy amplifier.

9. The charge trapping correction means of claim 8 wherein the polynomial function is selected to be $KS_o\tau^n$, K is a constant, $S_o$ is indicative of the peak sensed from the output of said detector and $\tau$=a measured charge collection time.

10. The charge trapping correction means of claim 9 wherein said analog computer means is selected to provide a value of n from between 1 to 3.

* * * * *